United States Patent Office 3,481,909
Patented Dec. 2, 1969

---

3,481,909
INTERPOLYMERS OF A BRANCHED CHAIN ALPHA-OLEFIN AND A DIOLEFIN HAVING INTERNAL, STERICALLY HINDERED UNSATURATION
Joseph Di Pietro, West Millington, N.J., assignor to Celanese Corporation, New York, N.Y., a corporation of Delaware
No Drawing. Filed July 11, 1966, Ser. No. 563,963
Int. Cl. C08f 15/04
U.S. Cl. 260—80.78
16 Claims

ABSTRACT OF THE DISCLOSURE

Copolymers containing residual unsaturation prepared by polymerizing in the presence of a stereospecific coordination catalyst a branched chain monoolefin containing a vinyl group and an unconjugated, multi-lower alkyl-substituted diolefin having internal, sterically hindered unsaturation.

---

This invention relates broadly to copolymer compositions, to shaped articles made therefrom and to preparative methods. More particularly it is concerned with compositions comprising a copolymer obtained by polymerization, with the aid of a stereospecific or coordination catalyst system, of a plurality of certain particular ethylenically unsaturated hydrocarbons one of which is an unconjugated diolefin.

There is relatively little prior art on the polymerization of unconjugated diolefins with stereospecific catalysts. Makowski et al. in J. Polymer Sci., Part A, vol. 2, 1549 (1964), have described the preparation of 1,5-hexadiene polymers using various modified alkyl-metal coordination catalysts. These polymers are reported by the authors to be crystalline, to have high tensile strengths and high melting points, and to be very flexible. Marvel and Stille in J.A.C.S., 81, 1740 (1959), reported upon the preparation of alpha-diolefins having the general formula

$$CH_2=CH(CH_2)_nCH=CH_2$$

where $n$ represents a number from 4 to 18. They found that the polymers obtained with aluminum triisobutyl-titanium tetrachloride consisted of both soluble and insoluble, cross-linked fractions; and that the soluble polymers possessed cyclic and open-chain units containing terminal unsaturation as was present in the monomer. Valvassori et al., Chim. Ind. (Milan), 44, 1095 (1962), have described the preparation of poly(1,5-hexadiene) and copolymers of 1,5-hexadiene and ethylene with combinations of $Al(C_2H_5)_2Cl$ and vanadium compounds. However, with these catalytic systems, about 75–80% of the 1,5-hexadiene polymerizes through one double bond only, yielding polymers that are substantially amorphous in nature. In another paper Makowski et al., J. Polymer Sci., Part A, vol. 2, 4973 (1964), describe the preparation and properties of crystalline copolymers of ethylene and 1,5-hexadiene with a wide range of proportions of the starting components. The X-ray diffraction patterns of these copolymers showed two distinct phases. However, the unit cell sizes of these two phases were different from those of the respective homopolymers.

In marked contrast to the known prior art as exemplified above, the present invention is concerned with the production of copolymers, by stereospecific copolymerization technique, of a plurality of different monomers one of which is an alpha-olefin having in its molecule an internal, sterically hindered, double bond that is non-polymerizable during the course of the copolymerization reaction. More particularly this component of the polymerizable mass or mixture consists essentially of at least one (e.g., two, three, four or any desired number) multi-(lower alkyl) substituted, unconjugated diolefin having at least two and not more than six lower alkyl substituents and containing a total of from 7 to 24 carbon atoms, inclusive. The other component of the polymerizable mass is a particular branched alpha-monoolefin. By using these particular copolymerizable ingredients and polymerization technique, copolymers are produced that contain in the molecular structure thereof tri-substituted, double-bonded carbon atoms. No prior art is known that teaches or suggests the production of such copolymers as they are broadly and specifically disclosed and claimed herein.

Hydrocarbon homopolymers and copolymers heretofore produced often have a melting point that is too low for certain end uses, e.g., in the production of films and filaments for the manufacture of fabrics that may be subjected to various treatments involving the use of relatively high temperatures. In other cases the polymer (homopolymer or copolymer), while having an adequately high melting point, may be too brittle for the production of satisfactory shaped articles such as films, filaments, sheets, ribbons, tapes, rods, tubes, and the like. In still other cases the polymer, although its stability at ambient temperature (20°–30° C.) is satisfactory, tends to degrade seriously upon being subjected to an elevated temperature; as a result, the mechanical properties, e.g., the tenacity, tend to become adversely affected when the shaped article is subjected to relatively high temperatures.

One of the main disadvantages of the prior hydrocarbon polymers has been the fact that they did not lend themselves readily to the introduction of polar groups, dye sites (including potential dye sites) and other modifications that are often desirable in order to dye the polymer (or a shaped article made therefrom) more readily or to a deeper shade; to improve its resistance to the accumulation of static charges of electricity; or, in the case of filamentary material and fabrics manufactured from the filaments, to improve the feeling to the touch or the "hand" of such textile materials. This difficulty is minimized or obviated by the present invention, since the ethylenically unsaturated double bond(s) remaining in the copolymer molecule makes the copolymer more amenable to modification with various modifiers such as acrylonitrile; sulfonating agents, e.g., $SO_3$; hydroxylating agents including alkali-metal hydroxides, e.g., KOH; certain types of dyes; organic and inorganic acids; oxygen, ozone, peroxides and the like; bromine; or, in general, any substance that is capable of attacking an internal double bond. Preferably such a substance or reactant is one that enhances the characteristics of the copolymer such as appearance, physical properties, suitability for a particular field of utility or a particular end use, processability, and the like.

It is a primary object of this invention to provide hydrocarbon copolymers having improved and unobvious properties.

It is a further object of this invention to provide shaped articles such as filaments, films and the like from the copolymers of the invention.

Another object of the invention is to provide hydrocarbon copolymer compositions and articles that contain ethylenically unsaturated groups in the copolymer molecule whereby the copolymer is made more amenable to treatment such that its properties can be modified to make it most adaptable for its intended use.

Still another object of the invention is to provide a method of making the copolymer compositions of the invention.

Other objects of the invention will be apparent to those skilled in the art from the following more detailed description and from the appended claims.

The objects of the invention are attained by producing a composition (and also a shaped article from the composition) that comprises essentially a plurality (e.g., two, three, four or any desired higher number) of copolymerizable ingredients, more particularly copolymerizable monomers, including (A) A major (more than 50%) molar amount of at least one olefin selected from the group consisting of branched monoolefines containing a vinyl grouping, $CH_2=CH—$, and a total of from 5 to 14 carbon atoms, inclusive, and (B) A minor (less than 50%), but substantial (e.g., at least about 1 mole %), molar amount of at least one multi-(lower alkyl)-substituted, unconjugated diolefin having at least two and not more than six lower alkyl substituents and containing from 7 to 24 carbon atoms, inclusive.

The lower alkyl substituents in the unconjugated diolefin of (B) sterically hinder double-bonded carbon atoms. Such lower alkyl substituents are, for example, those alkyl groups that contain from 1 through 5 carbon atoms, e.g., methyl, ethyl, and the normal and isomeric forms of propyl, butyl and amyl.

As previously has been pointed out, the copolymers of the invention contain, in their molecular structure, the aforementioned tri-substituted, double-bonded carbon atoms. The preferred copolymers are further characterized by exhibiting crystallinity under X-ray examination, that is, in an X-ray diffraction pattern.

The catalyst system and general polymerization technique

The stereospecific catalyst used in the preparation of the copolymers of this invention is generally composed of at least two components. The first component of the catalyst may be, for example, a reducing component comprising at least one compound of one or more elements from Groups III$b$ of the Periodic Table (Mendeleev), attached directly to a carbon atom or hydrogen. Some specific compounds within the class are metal alkyls and aryls and metal alkyl halides of aluminum, gallium, and indium, wherein each organic group contains, for example, from 1 to 10 carbon atoms, e.g., aluminum diethyl chloride, aluminum trimethyl, aluminum triethyl, and aluminum triisobutyl. The preferred compounds are the aluminum alkyls, e.g., aluminum diethyl chloride.

The second component of the catalyst may be an oxidizing component comprising a compound of one or more transition heavy metals from Groups IV$a$, VI$a$, VII$a$, or VIII of the Periodic Table (Mendeleev) wherein said element has a valence above its most reduced state. The metal may be attached, for example, to a halide, oxyhydrocarbon, e.g., alkoxide, or an oxide group. Some specific compounds are, for instance, titanium tri- and tetrachloride, zirconium tetrabromide, chromyl chloride, chromyl acetate, vanadium trichloride and vanadium oxychloride. The oxidizing component may also be a compound having a homogeneous crystalline structure and a unique and characteristic X-ray diffraction pattern, and which is prepared by reacting aluminum metal with titanium tetrachloride in the presence of an organic solvent and, if desired, aluminum chloride as a catalyst at a temperature of 80° to 220 C. as described in French Patent No. 1,246,631. This latter catalyst component is referred to below as the "titanium composition."

The titanium composition is essentially a trivalent titanium composition in which the titanium and aluminum values are combined with chlorine.

The organic solvent is used in an amount effective in dispersing the reactants sufficiently; in many cases this amount is in the range of 0.5 to 3 liters per gram milli-equivalent of titanium in the titanium composition, an equivalent weight of titanium being defined as equal to a gram atom of titanium. On cooling the mixture, particles of titanium composition of very small size, e.g., less than 5 microns and having a homogenous crystalline structure, are formed and may be filtered or used as a slurry in part of the solvent in the preparation of the catalyst system used in practicing this invention. The compound dissolves readily in water and remains dissolved. It also disperses readily in hydrocarbons.

The organic solvent used in the preparation of the titanium composition, which should be distinguished from any solvent used in a subsequent polymerization, preferably boils within the reaction temperature range of 80° to 220° C., although higher boiling solvents may be used. Some of the solvents contemplated are aliphatic and aromatic hydrocarbons, e.g., kerosene, mineral spirits, paraffin oil, mineral oil, xylene, toluene, benzene, naphthalene and tetralin as well as halogenated hydrocarbons such as chlorobenzene and the like.

When the titanium composition is prepared by reacting aluminum metal with titanium tetrachloride in the presence of an organic solvent the crystals produced contain varying amounts of the organic solvent associated therewith. The amount of associated organic solvent varies considerably and is dependent upon the operational conditions employed. Should it be desirable to remove some or even a major portion of the solvent any standard extraction process may be employed. Up to $9/10$ of the organic solvent can be readily removed by simple extraction methods using various agents, e.g., toluene, petroleum ether, carbon disulfide and the like. Compositions containing as little as 3–4% organic solvent have been prepared in this manner.

In carrying out the polymerization process, the components of the catalyst are contacted with monomer under agitation in a reactor either in the presence of an organic solvent for the polymerization or without the addition of any solvent. It has been found that cyclohexane is particularly suitable as a reaction solvent although any organic solvent which does not react with the catalyst components may be used. In general, substances such as oxygen and water which may unfavorably interfere with the polymerization are rigidly excluded from the system, e.g., through the use of a nitrogen blanket in the vapor space. However, in some cases hydrogen may be present in the system as a control on the inherent viscosity of the polymer obtained.

After the reaction has proceeded to the desired point, it is interrupted and the polymer precipitated by adding to the mass a nonsolvent for the polymer, e.g., methanol. The polymer is then separated and washed. The process may be carried out batchwise wherein the monomer is added to a mass of catalyst in an autoclave until the desired amount of polymer is produced after which the reaction is interrupted and the polymer precipitated, or the process may be carried out continuously, e.g., by passing streams of catalyst, solvent and monomer into the bottom of the reactor and continuously withdrawing the mass comprising polymer, catalyst, unreacted monomer and solvent from the top of the reactor.

In carrying out the process of the invention, the reducing component of the catalyst may be used in an amount of from 5 to 100 moles, preferably from 10 to 50 moles, per 1,000 liters of solvent, if a solvent is used. Generally the reducing component is present in the reaction zone in an amount of from 1 to 50 millimoles, preferably from 1 to 10 millimoles, per mole of monomer. The amount of the oxidizing component of the catalyst may be, for example, in the range of from 0.1 to 1 mole, preferably from 0.2 to 0.5 mole, per mole of reducing component. The temperature of polymerization may be, for example, in the range of from 20° to 100° C., preferably from 40° to 70° C., and the pressure, for example, may be in the range of from 15 to 500 p.s.i.g., preferably from 15 to 150 p.s.i.g.

The branched monoolefin

The branched monoolefin comonomer contains, as heretofore stated, a vinyl grouping, more particularly a terminal vinyl grouping, and a total of from 5 through 14 carbon atoms including both those in the linear backbone and in the branched chain or chains. Illustrative examples of such comonomers are the various 3-(lower alkyl)-1-butenes represented by the general formula (I) 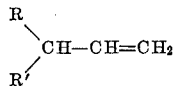

wherein R and R' each represent a lower alkyl radical containing, for example, from 1 through 5 carbon atoms that may be the same or different, and including methyl, ethyl, and the normal and isomeric forms of propyl, butyl and amyl radicals. Examples of monoolefins embraced by Formula I are 3-methyl-1-butene (also known as isopropyl-ethylene and alpha-isoamylene), 3-ethyl-1-butene, 3-n-propyl-1-butene, 3-isopropyl-1-butene, and the 3,3-dimethyl-, 3,3-diethyl- and 3-methyl-3-ethyl-1-butenes.

Other examples of branched monoolefinic comonomers that may be used in practicing this invention are 3-methyl-1-pentene, 4-methyl-1-pentene, 3-ethyl-1-pentene, 4-ethyl-1-pentene, 4,4-dimethyl-1-pentene, 4,4-dimethyl-1-hexene, 3-methyl-1-hexene, 4-methyl-1-hexene, 5-methyl-1-hexene and 6-methyl-1-heptene. The branched monoolefin (1-alkene) is most suitably 3-methyl-1-butene; another preferred 1-alkene comonomer is 4-methyl-1-pentene. The alkyl substituent may be cycloalkyl as in, for example, 3-cyclopentyl-1-propene and 3-cyclohexyl-1-propene. Although the branched chain in the 1-alkene comonomer is preferably an alkyl (including cycloalkyl) grouping, the presence of aryl substituents in the 1-alkene is not precluded as in, for instance, 3-phenyl-1-butene.

The Alky-substituted unconjugated diolefin

The multi- (i.e., di-, tri-, tetra, penta-, and hexa-) substituted unconjugated diolefins containing a total of from 7 to 24 carbon atoms, inclusive, that are copolymerized with a branched monoolefin in producing the copolymers of the invention include, for example, the various 5-(lower alkyl)-1,4-hexadienes, e.g., 5-methyl-1,4-hexadiene, the formula for which is (II)     $CH_2-CH-CH_2-CH-C-CH_3$ the various 4,5-di-(lower alkyl)-1,4-hexadienes including the 4,5-dimethyl- through 4,5-dibutyl- (both normal and isomeric)-1,4-hexadienes, as well as those wherein the alkyl substituents are unsymmetrical or "mixed"; and the di-(lower alkyl)-2,7-octadienes, more particularly 2,4-dimethyl-2,7-octadiene and 2,6-dimethyl-2,7-octadiene. The 2,4-di-(lower alkyl)-2,7-octadienes may be represented by the general formula III     $\underset{1\ \ \ 2\ \ \ 3\ \ \ 4\ \ \ 5\ \ \ 6\ \ \ 7\ \ \ 8}{CH_3-\overset{R}{\underset{|}{C}}=CH-\overset{R'}{\underset{|}{CH}}-CH_2-CH_2-CH-CH_2}$ wherein R and R', which may be the same or different, each represent a lower alkyl radical, e.g., methyl, ethyl, and the normal and isomeric forms of propyl, butyl and amyl. A general formula for the 2,6-di-(lower alkyl)-substituted 2,7-octadienes will be apparent to those skilled in the art from Formula II.

Illustrative examples of other multi-(lower alkyl)-substituted, unconjugated diolefins that may be employed are the dimethyl-, diethyl- and the normal and isomeric forms of dipropyl-, dibutyl- and diamyl-substituted, unconjugated nonadienes, and decadienes through doeicosadienes in the various isomeric forms of these unconjugated diolefins. Or, in lieu of or in addition to these dialkyl-substituted diolefins, one may utilize the tri-, tetra-, penta- or hexaalkyl-substituted derivatives, selecting (as is also done when using the dialkyl derivatives) those wherein the number of alkyl substituents, the number of carbon atoms in each substituent and the length of the unconjugated diolefin chain are such that the total number of carbon atoms in the molecule of the diolefin does not exceed about 24.

Still other examples of unconjugated diolefins that may be employed, singly or a plurality thereof, as a comonomer with the branched monoolefin are the various 3,4,5-tri-(lower alkyl)-1,4-hexadienes such as 3,4,5-trimethyl-1,4-hexadiene; the various 2,4,6-tri-(lower alkyl)-2,7-octadienes, e.g., 2,4,6-trimethyl-2,7-octadiene; the various 2,4,6,8-tetra-(lower alkyl)-2,9-decadienes, e.g., 2,4,6,8-tetramethyl-2,9-decadiene; the 4,5-dimethyl and 4,5-diethyl-1,4-heptadienes, -octadienes, -nonadienes, -decadienes, -undecadienes and -dodecadienes; the 4,5-dimethyl- and 4,5-diethyl-1,5-heptadienes, -octadienes, -nonadienes, -decadienes, -undecadienes and -dodecadienes; and the 4,5-dimethyl- and 4,5-diethyl-1,6-octadienes -nonadienes, -decadienes, -undecadienes and -dodecadienes.

Other examples of suitable unsubstituted diolefins will be apparent to those skilled in the art from the foregoing illustrative examples.

It is not essential that the branched monoolefin or the unconjugated diolefin used in practicing this invention be a single monomer having a definite number of carbon atoms within the specified ranges. For example, either or both of the monomers may be commercial or pilot-plant fractions comprised of species containing a number of carbon atoms that is lower and/or higher than that which is within the specified ranges of carbon atoms so long as the average number of carbon atoms in the branched monoolefin comonomer and in the unconjugated diolefin comonomer is within the prescribed range. When either or both of the define dcopolymerizable ingredients are composed of such fractions, it is preferred to keep the composition of the individual fraction within a relatively narrow range of minimum and maximum carbon contents of the individual species therein and which is economically consistent with the practical copolymerization results desired.

Generally, the defined multi-(lower alkyl)-substituted, unconjugated diolefinic comonomer component (B), which together with the defined branch monoolefinic comonomer component (A) is subjected to a copolymerization reaction in the presence of a stereospecific catalyst, is present in the polymerizable mixture or mass in a molar percentage corresponding to form 1 to about 35, preferably from 1 to about 20, mole percent of the total molar amount of (A) and (B). It is to be understood, of course, that the use of lower or higher molar amounts of component (B) is not precluded. For instance, in some instances it may be desirable that component (B) be employed in an amount such that it constitutes only 0.5 mole percent, while in others it may constitute as much as about 49 mole percent, of the total molar amount of (A) and (B) undergoing copolymerization. The lower molar percentages of component (B) are usually desirable when one seeks to obtain copolymers having a maximum degree of crystallinity as evidenced by their X-ray diffraction pattern.

In one aspect of the method features of the present invention the defined copolymerizable ingredients are contacted with the stereospecific catalyst system as broadly described hereinbefore. The copolymerization reaction is effected at ambient temperature to yield a polymerization product comprising (a) organic solvent-soluble homopolymers of each of the starting copolymerizable ingredients of (A) and (B), and (b) an organic solvent-insoluble copolymer of (A) and (B). The method includes the additional step of separating from each other the (a) and (b) components of the said polymerization product by extracting the said product with an organic solvent in which one of the components of the polymerization product is soluble and the other is insoluble. Ilustrative examples of organic solvents that may be employed in this extraction technique are the various normally liquid alkanes, e.g., n-hexane, n-octane, n-nonane, n-decane and higher members of the homologous serious. Other examples include toluene, xylene, chlorobenze, o-dichlorobenozene, fluorobenzene and "Decalin" (decahydronaphthalene).

As shown in the examples that follow (see Table 1), the present invention provides fusible copolymers. Apparently the internal double bond in the unconjugated diolefin does not interfere in a normal head-to-tail copolymerization reaction to yield a fusible product.

The copolymers of this invention can be made into various shaped articles, e.g., filaments (both mono- and multifilaments), films, and the like. They can be melt spun into filaments having particularly good mechanical properties as indicated, for example, by a high tensile factor, i.e., the product of the tenacity in grams/denier and the percent elongation. Also, they tend to retain a greater proportion of their original physical properties when subjected to elevated tempeartures.

In order that those skilled in the art may better understand how the present invention can be carried into effect, the following examples are given for purpose of illustration and not by way of limitation. All parts and percentages are by weight unless otherwise stated.

Examples 1 through 12

The following polymers were prepared:

| Example No.: | Polymer |
|---|---|
| 1 | Homopolymer of 3-methyl-1-butene (3MB). |
| 2 | Homopolymer of 1,7-octadiene. |
| 3 | Homopolymer of 2,4-dimethyl-2,7-octadiene (2,4-DO). |
| 4 | Homopolymer of 2,6-dimethyl-2,7-octadiene (2,6-DO). |
| 5 | Copolymer of 3MB and 1,7-octadiene. |
| 6 | Ditto in a different molar ratio. |
| 7 | Copolymer of 3MB and 2,4-DO. |
| 8 | Ditto in a different molar ratio. |
| 9 | Ditto in a different molar ratio. |
| 10 | Ditto in a different molar ratio. |
| 11 | Copolymer of 3MB and 2,6-DO. |
| 12 | Ditto in a different molar ratio. |

The four monomers, 3-methyl-1-butene, 1,7-octadiene, 2,4-dimethyl-2,7-octadiene and 2,6-dimethyl-2,7-octadiene, were obtained from commercial sources. Prior to use, they were fractionally distilled through a 12-inch helix-packed column, then dried with Linde molecular sieves and kept under an atmosphere of nitrogen until they were used. Gas-chromatographic analyses of these monomers indicated a purity higher than 99%. All the solvents used in these examples were dried with Linde molecular sieves and distilled before use. The stereospecific catalysts were prepared in known manner (see the prior discussion with reference to such catalysts).

The polymerization procedure for producing the homopolymers and copolymers is exemplified by the following more detailed description:

A 350 ml. polymerization tube, equipped with a side arm, was flamed while being evacuated and swept several times with dry nitrogen. Four and six-tenths grams (4.6 g.; 36 millimoles) of aluminum-activated titanium trichloride, i.e., $TiCl_3$, AA, 200 ml. of n-heptane and 20 ml. of a 4.8 molar solution of $Al(C_2H_5)_2Cl$ in n-heptane were introduced into the polymerization tube in the stated order. A predetermined amount of 3MB was syringed into the tube, followed immediately by the addition of a known amount of 2,4-DO. The temperature of the reaction was kept at 25°–30° C., and the polymerization was allowed to proceed for 24 hours before being quenched with 200 ml. of methanol and 5 ml. of di-n-butyl phosphite. The solid, white polymerization product was suction-filtered, washed twice with methanolic 5% HCl, and then twice with water, after which it was oven-dried at 60° C. for 24 hours. The yield, infrared analysis, characteristics under X-ray examination and melt extrudability of the polymerization product were determined.

The crude products obtained by the polymerization process, exemplified by that described in the preceding paragraph, are white solids. They were subjected to a Soxhlet extraction for 24 hours using n-heptane as the solvent. The extraction of the copolymers yielded two different products. Taking the copolymerization of 3MB and 2,4-DO as illustrative, these products were: (1) a soluble, low-molecular-weight fraction consisting primarily of amorphous poly(2,4-dimethyl-2,7-octadiene) and crystalline poly(3-methyl-1-butene) of low molecular weight; and (2) an n-heptane-insoluble (HI) fraction which consisted essentially of a high-molecular copolymer of 3MB and 2,4-DO.

When possible, the melt behavior of the polymerization products at 330° C., as expressed in $M.I._0^{330}$ (melt index at 330° C. at zero time), was determined. This determination was made as follows:

The polymer, obtained as a white powder, was compressed into pills of ⅜-in. diameter and about ¾-in. length to give a minimum of 3 grams collective weight. The pills were transferred to the melt indexer (adjusted to 330° C. constant temperature), introduced into the barrel of the device, and the weight applied. Zero time was taken as the moment of the application of the weight. Usually no extrudate was collected during the first and second minute. Thereafter, the extruded polymer was cut off every minute by lightly wiping across the orifice with a metal spatula. After 20 minutes, the test was stopped by removing the weight and polymer. The weights of each extrudate of the polymer were determined and plotted on a logarithmic scale versus time.

Apparatus employed in characterizing the polymerization products included the following:

A Bausch-Lomb polarizing microscope was used for determining the crystalline melting point. The infrared spectra were obtained by a double beam Perkin-Elmer 21 spectrophotometer, using NaCl optics. All the copolymer samples for IR analysis were prepared by hot molding into films of 3 to 5 mils thickness at a temperature of about 160°–180° C. under a pressure of about 2000–2400 p.s.i. The monomers were run in demountable cells while the 2,4-DO homopolymer was cast on a salt window from a benzene solution. The X-ray examinations were registered on powdered samples using a Phillips-type PW1008–60 instrument. The melt index of the polymers was determined (ASTM D1238–57T) with the Tinius Olsen indexer equipped with a thermodyne temperature regulator, a standard weight of 2.040 kgs. and a die having an orifice 0.040 inch in diameter.

More detailed informataion on the molar proportions of monomeric reactants, conversion yields in 24 hours, percentage of n-heptane-insoluble (HI) material, and the properties of the latter are given in Table I. In producing the polymerizataion products reported in this table (i.e., the homopolymers and copolymers of Examples 1 through 12) a two-component catalysts system consisting of $TiCl_3$, AA (12 millimoles) and $Al(C_2H_5)_2Cl$ (48 millimoles) was used in all cases. In the second and third column headings ("M1" refers to the monoolefinic monomer and "M2" to the unconjugated diene monomer. The numbers in the column headed M.I.$_0^{330}$ are mg./min.

Table I follows:

yield of the crystalline copolymers of 3MB and the 2,4-dimethyl- and the 2,6-dimethyl-2,7-octadienes were approximately twice as much, more particularly from about

TABLE 1.—DATA ON HOMOPOLYMERS AND COPOLYMERS OF EXAMPLES 1 THROUGH 12

| Example Number | M1 (Moles) | M2 (Moles) | Conversion percent, 24 hours. | X-ray | H.I. Fraction M.P., °C. | M.I.$_0^{330}$ | Heptane Insoluble, percent |
|---|---|---|---|---|---|---|---|
| 1 | 3MB, 1.0 | | 59 | Highly crystalline | 305 | 1.2 | 8 |
| 2 | | 1,7-octadiene, 1.0 | 24 | Amorphous | | (¹) | 99 |
| 3 | | 2,4-DO, 1.0 | 39 | do | ² S.P. ca. 106 | | 90 |
| 4 | | 2,6-DO, 1.0 | 35 | do | ² S.P. ca. 98 | | 0 |
| 5 | 3MB, 0.37 | 1,7-octadiene, 0.035 | 15.2 | do | | (¹) | 98 |
| 6 | 3MB, 0.37 | 1,7-octadiene, 0.07 | 19.1 | do | | (¹) | 98 |
| 7 | 3MB, 0.37 | 2,4-DO, 0.01 | 38.0 | Crystalline | 275 | 4.4 | 94 |
| 8 | 3MB, 0.37 | 2,4-DO, 0.027 | 40.3 | do | 277 | 9.2 | 90 |
| 9 | 3MB, 0.37 | 2,4-DO, 0.054 | 36.7 | do | 273 | 3.2 | 74 |
| 10 | 3MB, 0.37 | 2,4-DO, 0.081 | 28.0 | do | 255 | 11.0 | 71.5 |
| 11 | 3MB, 0.37 | 2,6-DO, 0.027 | 30.3 | do | 275 | 2.2 | 94 |
| 12 | 3MB, 0.37 | 2,6-DO, 0.054 | 29.6 | do | 273 | 1.6 | 97 |

¹ Cross-linked. ² S.P.=Softening Point.

The crystalline copolymers of 3MB and 2,4-DO were not soluble in any of the organic solvents that were tried. More particularly they were insoluble in each of the following: chlorobenzene, o-dichlorobenzene, toluene, xylene and "Decalin." Hence they were melt extruded.

Melt extrusion of the crystalline 3MB/2,4-DO copolymers was carried out at 330° C. using the same melt indexer employed for the M.I. determinations. They were not stretched after extrusion to improve their properties. Testing was performed on single filaments.

Table II shows the tensile data and denier of a filament that was melt spun from the copolymer of Example 8 both originally and after it had been U.V. irradiated under two different conditions; and, also, after it had been refluxed in glacial acetic acid for 18 hours in the presence of a peroxy catalyst, specifically di-tert.-butyl peroxide. The data on the original fiber shows it to have a high elongation and good tenacity. The treatment with U.V. irradiation and with a peroxide catalyst in glacial acetic acid to effect mild cross-linking did not improve the particular physical properties shown in the table. However, the properties were changed as evidenced by the difference in the tabulated values. The lamp used as the source of the U.V. radiation was a Dazor Floating Fixture lamp (Model UL 2324–16) equipped with two General Electric 15 watt black light bulbs.

TABLE II.—PHYSICAL DATA ON MELT-EXTRUDED FIBER FROM COPOLYMER OF EXAMPLE 8

| | Straight Tensile | | |
|---|---|---|---|
| | Elongation, percent | Tenacity, g./d. | Denier |
| Original fiber | 32.7 | 4.46 | 1.38 |
| After U.V. irradiation for 1 hour, 8" from source | 36.6 | 2.13 | 3.08 |
| After U.V. irradiation for 1 hour, 4" from source | 36.4 | 2.30 | 2.92 |
| After refluxing in glacial acetic acid for 18 hours in the presence of di-tert.-butyl peroxide | 36.2 | 1.65 | 3.83 |

From the foregoing examples, and particularly Examples 1 through 12, it will be noted that when a sterically unhindered unconjugated diene such as 1,7-octadiene was homopolymerized or was copolymerized with a branched monolefin, specifically 3-methyl-1-butene, invariably amorphous, intractable and cross-linked polymerization products were obtained. However, when sterically hindered unconjugated dienes such as the 2,4- and 2,6-dimethyl-2,7-octadienes were copolymerized with this same comonomer, 3-methyl-1-butene, then crystalline copolymers in all cases were obtained, that is, when the branched monoolefin constituted a major and the unconjugated diolefin was a minor molar amount of the total molar amount of these copolymerizable ingredients.

It will also be noted that the copolymers of 3MB and 1,7-octadiene were obtained in a low conversion yield (about 15–20%). In marked contrast the conversion 28 to 40%. The copolymers of the invention, exemplified by those just mentioned, are further characterized by containing a tri-substituted double bond that is capable of undergoing further reaction with reactive treating agents or means.

Quantitative estimations of the substituted octadienes present in the 3MB-2,4-DO copolymers were made by calculating the molar absorptivities (E/mole/ml./cm.) of the R′CH–CH″R‴ unsaturation using the monomer and homopolymer of 2,4-dimethyl-2,7-octadiene as reference. The values found were $3.0 \times 10^4$ and $3.31 \times 10^4$ for the monomer and homopolymer, respectively. These values are in good agreement with those reported in the literature [McMurry et al., Anal. Chem., 24, No. 2 (1952)]. In Table III are shown the compositional ranges of some 3MB-2,4-DO copolymerization products based in calculated infrared analyses and on the actual charges use in the individual copolymerization run.

TABLE III

| Sample | Unsaturation, g./100 C atoms | Molar Ratio 3MB:2,4-DO Calculated (Infrared) | Molar Ratio Charged |
|---|---|---|---|
| "As is" | 1.07 | 1:0.125 | 1:0.143 |
| Heptane insoluble (HI) | ¹ 0.91 | 1:0.045 | |
| Heptane insoluble | 0.45 | 1:0.02 | 1:0.03 |
| Do | 0.37 | 1:0.01 | 1:0.02 |

¹ As 82% HI of total.

It will be noted from the data given in Table III that the agreement between the molar ratio of 3MB:2,4-DO charged to make the copolymer and that calculated from infrared (IR) analyses is quite good.

In order to further substantiate the presence of the substituted vinylidene groups in the copolymers of the invention, specifically copolymers of 3MB and 2,4-DO, some samples of the latter were brominated and the resulting products were examined by infrared. The bromination results were satisfactory, giving values of 20–38 mgs. of Br$_2$ per gram of sample, compared to calculated values of 33 mgs. of Br$_2$. An IR spectrum of a brominated copolymer sample showed virtual disappearance of the substituted vinylidene absorption.

It will be understood, of course, by those skilled in the art that numerous variations may be made from the embodiments of the invention described in the foregoing example. Thus, instead of the specific stereospecific catalyst system employed in the examples, one may use any of the other known catalysts of this type such as those broadly and specifically described in the portion of this specification prior to the examples. Also, instead of using 3-methyl-1-butene and a dialkyl-substituted, unconjugated 2,7-octadiene as the copolymerizable ingredients, one can employ a major molar proportion of any of the other branched monoolefins and a minor molar proportion of any of the other sterically hindered unconjugated diolefins of the kind broadly defined hereinbefore and of which numerous specific examples have been given.

In brief, it is to be understood that the foregoing detailed description is merely by way of illustration and that many variations may be made therein without departing from the spirit of my invention.

The embodiments of the invention in which an exclusive property or privilege is claimed are defined as follows:

1. A composition comprising a copolymer obtained by polymerization of a plurality of copolymerizable ingredients including
    (A) a major molar amount of at least one olefin selected from the class consisting of branched monoolefins containing a vinyl grouping and a total of from 5 to 14 carbon atoms, inclusive, and
    (B) a minor molar amount of at least one multi-(lower alkyl)-substituted, unconjugated diolefin having at least two and not more than six lower alkyl substituents and containing a total of from 7 to 24 carbon atoms, inclusive,
said diolefin having one double bond capable of participating in a polymerization reaction and one nonpolymerizable, sterically hindered, internal double bond, said copolymer containing residual unsaturation.

2. A composition as in claim 1 wherein the copolymer exhibits crystallinity under X-ray examination.

3. A composition as in claim 1 wherein the copolymerizable ingredient of (B) is present in the polymerizable mass in a molar percentage corresponding to from 1 to about 35 mole percent of the total molar amount of (A) and (B).

4. A composition as in claim 1 wherein the monoolefinic ingredient of (A) includes 3-methyl-1-butene.

5. A composition as in claim 1 wherein the multi-(lower alkyl)-substituted, unconjugated diolefin of (B) is a di-(lower alkyl)-substituted, unconjugated diolefin containing a total of from 7 to 24 carbon atoms, inclusive.

6. A composition as in claim 5 wherein the di-(lower alkyl)-substituted, unconjugated diolefin includes a di-(lower alkyl)-substituted 2,7-octadiene.

7. A composition as in claim 6 wherein the di-(lower alkyl)-substituted 2,7-octadiene is a dimethyl-substituted 2,7-octadiene.

8. A composition as in claim 7 wherein the dimethyl-substituted 2,7-octadiene is 2,4-dimethyl-2,7-octadiene.

9. A composition as in claim 7 wherein the dimethyl-substituted 2,7-octadiene is 2,6-dimethyl-2,7-octadiene.

10. A composition as in claim 1 wherein the copolymer exhibits crystallinity under X-ray examination; the monoolefinic ingredient of (A) is 3-methyl-1-butene; the diolefinic ingredient of (B) is at least one member of the group consisting of 2,4-dimethyl-2,7-octadiene and 2,6-dimethyl-2,7-octadiene; and the said diolefinic ingredient of (B) is present in the polymerizable mixture in a molar percentage corresponding to from 1 to about 20 mole percent of the total molar amount of (A) and (B).

11. The composition of claim 1 in the form of a shaped article.

12. The composition of claim 2 in the form of filamentary material.

13. The composition of claim 10 in the form of filamentary material.

14. The composition of claim 10 in the form of a film.

15. The method of producing a copolymer which comprises contacting, with a stereospecific catalyst system, a plurality of copolymerizable ingredients including
    (A) a major amount of at least one olefin selected from the group consisting of branched monoolefins containing a vinyl grouping and a total of from 5 to 14 carbon atoms, inclusive, and
    (B) a minor molar amount of at least one multi-(lower alkyl)-substituted, unconjugated diolefin having at least two and not more than six lower alkyl substituents and containing a total of from 7 to 24 carbon atoms, inclusive,
said catalyst system comprising a compound of Group IIIb of the Periodic Table (Mendeleev) attached directly to a carbon atom and a compound of at least one transition heavy metal selected from the class consisting of Groups IVa, VIa, VIIa and VIII of the Periodic Table (Mendeleev) wherein said element has a valence above its most reduced state.

16. The method as in claim 15 wherein the defined copolymerizable ingredients are contacted with the catalyst system at ambient temperature to yield a polymerization product comprising (a) organic solvent-soluble homopolymers of each of the starting copolymerizable ingredients of (A) and (B), and (b) an organic solvent-insoluble copolymer of (A) and (B); and the method includes the additional step of separating from each other the (a) and (b) components of the said polymerization product by extracting the said product with an organic solvent in which one of the components of the polymerization product is soluble and the other is insoluble.

References Cited

UNITED STATES PATENTS

| | | | |
|---|---|---|---|
| 2,431,461 | 11/1947 | Calflee | 260—93 |
| 3,291,780 | 12/1966 | Gladding | 260—80.78 |

FOREIGN PATENTS 599,442  3/1948  Great Britain.

JOSEPH L. SCHOFER, Primary Examiner

ROGER S. BENJAMIN, Assistant Examiner

U.S. Cl. X.R.

260—88.2